United States Patent
Cho (10) Patent No.: US 11,048,896 B1
(45) Date of Patent: Jun. 29, 2021

(54) CONTROL BOX FOR TOKEN

(71) Applicant: Sung Hoon Cho, Seoul (KR)

(72) Inventor: Sung Hoon Cho, Seoul (KR)

(*) Notice: Subject to any disclaimer, the term of this patent is extended or adjusted under 35 U.S.C. 154(b) by 0 days.

(21) Appl. No.: 17/148,836

(22) Filed: Jan. 14, 2021

(30) Foreign Application Priority Data

Jan. 15, 2020 (KR) .......... 10-2020-0005247

(51) Int. Cl.
| | |
|---|---|
| *G06K 7/08* | (2006.01) |
| *G06K 7/10* | (2006.01) |
| *F21V 23/00* | (2015.01) |
| *F21V 23/04* | (2006.01) |
| *G09B 19/00* | (2006.01) |
| *G09B 5/02* | (2006.01) |

(Continued)

(52) U.S. Cl.
CPC ........ *G06K 7/10366* (2013.01); *F21V 23/003* (2013.01); *F21V 23/04* (2013.01); *G09B 5/02* (2013.01); *G09B 19/003* (2013.01); *F21Y 2113/10* (2016.08); *F21Y 2115/10* (2016.08)

(58) Field of Classification Search
CPC ..... G06B 19/003; G06B 5/02; F21Y 2113/10; F21Y 2115/10; F21V 23/003; F21V 23/04; G06K 13/0875
See application file for complete search history.

(56) References Cited

U.S. PATENT DOCUMENTS

2003/0001016 A1* 1/2003 Fraier ............... H04L 65/1073
235/462.03

2007/0087834 A1* 4/2007 Moser ............... G07F 17/322
463/42

(Continued)

FOREIGN PATENT DOCUMENTS

| JP | 2005-000256 A | 1/2005 |
|---|---|---|
| JP | 6068521 B2 | 1/2017 |

(Continued)

OTHER PUBLICATIONS

Office action dated Jun. 1, 2020 from Korean Patent Office in a counterpart Korean Patent Application No. 10-2020-0005247 (all the cited references are listed in this IDS.) (English translation is also submitted herewith.).

(Continued)

*Primary Examiner* — Thien M Le
(74) *Attorney, Agent, or Firm* — The PL Law Group, PLLC (57) ABSTRACT

A control box for a learning or entertainment token according to an embodiment of the present disclosure includes tokens in which different codes are recorded, a token gate into which the tokens are inserted, a token rail configured to guide the tokens inserted into and falling from the token gate, a detection unit configured to detect the codes recorded in the tokens and installed between the token gate a storage box, and the storage box in which the tokens passing through the detection unit are stored, wherein when the code recorded in the token falling along the token rail is detected and transmitted to an external terminal, the terminal is configured to run a corresponding learning or entertainment application or proceed with steps, and thus preferred learning or entertainment is easily progressed step by step, thereby increasing an effective learning effect.

2 Claims, 4 Drawing Sheets

(51) Int. Cl.
*F21Y 113/10* (2016.01)
*F21Y 115/10* (2016.01)

(56) References Cited

U.S. PATENT DOCUMENTS

| | | | | |
|---|---|---|---|---|
| 2009/0176558 A1* | 7/2009 | Englman | ............ | G07F 17/3244 |
| | | | | 463/25 |
| 2012/0301009 A1* | 11/2012 | Dabic | ................... | G07D 5/005 |
| | | | | 382/136 |
| 2013/0288563 A1* | 10/2013 | Zheng | ..................... | A63H 3/28 |
| | | | | 446/268 |
| 2019/0005768 A1* | 1/2019 | Wilkinson | ........... | H04N 5/2257 |
| 2019/0206195 A1* | 7/2019 | Kido | ................... | G07F 17/3213 |
| 2019/0253254 A1* | 8/2019 | Brownlee | .......... | G06K 19/0725 |
| 2020/0410306 A1* | 12/2020 | Androsyuk | ............ | G06Q 20/34 |

FOREIGN PATENT DOCUMENTS

| | | |
|---|---|---|
| KR | 10-1439418 B1 | 9/2014 |
| KR | 20-2018-0003024 U | 10/2018 |
| KR | 20-0489687 Y1 | 7/2019 |

OTHER PUBLICATIONS

Notice of Allowance dated Sep. 16, 2020 from Korean Patent Office in a counterpart Korean Patent Application No. 10-2020-0005247 (all the cited references are listed in this IDS.) (English translation is also submitted herewith.).

* cited by examiner

CONTROL BOX FOR TOKEN

CROSS-REFERENCE TO RELATED APPLICATION

This application claims priority to and the benefit of Korean Patent Application No. 10-2020-0005247 filed on Jan. 15, 2020, now Korean Patent No. 10-2166347 issued on Oct. 8, 2020, the disclosure of which is incorporated herein by reference in its entirety.

BACKGROUND

1. Field of the Invention

The present disclosure relates to a control device, and more particularly, to a control box for a learning or entertainment token which controls learning or entertainment to be performed step by step in a terminal according to a code recorded in an inserted token.

2. Discussion of Related Art

Digital learning methods through specialized learning devices have been provided and present in various ways. However, the rapid development of communication services and digital terminals has dramatically reduced the efficiency and necessity of the learning methods and the specialized learning devices according to the related art.

This is because efficient applications may be selectively downloaded and used from the App Store on current universal terminals (smart phones/smart tablet personal computers (PCs)/digital smart TVs) and these digital terminals and communication services enable office work/learning/newspaper reading/broadcasting viewing/Internet connection/voice call/entertainment to be performed with various types of communication in one device.

Further, with the development of communication technology, the number of mobile communication service subscribers has explosively increased, and now most people own one or more portable terminals.

Accordingly, these days, the portable terminals are becoming a necessity for enhancing user convenience by providing various additional functions as well as the original function of providing a simple phone call function to a user.

That is, learning applications for preschool learning, which are operated in general digital terminals (smart phones/smart tablet PCs/digital smart TVs) and may perform step-by-step learning of various genres, are provided on the App Store and web pages, and a web server that stores and provides step-by-step learning content for each selected area in various genres is operated to provide educational content or entertainment content.

However, since the digital learning applications are difficult for preschool learners to progress learning on their own or is focused on unilateral knowledge injection, the learner easily loses interest.

In order to solve these problems, the existing preschool learning market has led to a market based on visiting teachers and offline learning. However, problems such as simple repetitive content types, complaints about the visiting teachers, and complaints about contract periods have occurred.

Accordingly, the existing preschool teaching method based on the visiting teachers and the offline learning has been changed to education methods applying smart equipment, which enhance cognitive ability, thinking ability, imagination, and the like of preschoolers.

Such education methods applying the smart equipment solves the existing complaints about the visiting teachers (the visiting teachers may be changed) through interactive content (learning interactively with children) using digital terminals and video call teaching methods using the smart equipment, provides content scheduled according to each age/each capacity of the preschoolers, provides uncontracted products due to the complaints about the contact periods, and provides dedicated terminals.

In particular, these days, the preschoolers use content using the smart equipment at high use frequency and high utilization, and thus according to such contemporary changes, methods to increase the interest in education and make learning or entertainment enjoyable are required.

SUMMARY

An objective of the present disclosure for solving these problems is to provide a control box for a token capable of running a learning or entertainment application in a terminal using information read from a wireless recognition tag.

Further, another objective of the present disclosure is to provide a control box for a token capable of executing the learning or entertainment application in the terminal according to a code recorded in a token.

Further, still another objective of the present disclosure is to provide a control box for a token which reads a code from a radio frequency identification (RFID) token and transmits the read code to the terminal through Bluetooth.

Further, yet another objective of the present disclosure is to provide a control box for a token capable of running the learning or entertainment application in the terminal disposed on an upper portion of a body using a token inserted into the body.

A control box for a learning or entertainment token, which includes two or more tokens in which different codes are recorded, and reads the codes recorded in the tokens to transmit the read codes to a terminal, the terminal being operated to drive a learning or entertainment application corresponding to the read codes or control a progression stage of displayed learning or entertainment according to an embodiment of the present disclosure, may include a token gate into which the tokens are inserted, a token rail configured to guide the tokens inserted into and falling from the token gate, a detection unit configured to detect the codes recorded in the tokens, and a storage box in which the tokens passing through the detection unit are stored.

Further, a control box for a learning or entertainment token according to another embodiment of the present disclosure may include two or more tokens in which different codes are recorded, a terminal configured to drive a learning or entertainment application according to a transmitted code signal, and a reading device configured to read the codes recorded in the tokens to transmit the read codes to the terminal, wherein the terminal drives the learning or entertainment application corresponding to the read codes transmitted from the reading device and controls a progression stage of displayed learning or entertainment.

The reading device may include a token gate into which the tokens are inserted, a token rail configured to guide the tokens inserted into and falling from the token gate, a detection unit configured to detect the codes recorded in the tokens, and a storage box in which the tokens passing through the detection unit are stored.

Further, the detection unit may be installed between the token gate and the storage box and configured to detect the codes recorded in the tokens falling along the token rail, and the control box may include a terminal holder formed coplanar with the token gate, the terminal being disposed on the terminal holder, and a Bluetooth unit configured to transmit the codes read by the detection unit to the terminal disposed on the terminal holder.

Further, the control box may further include a display unit lit up differently when a power source is turned on or Bluetooth transmission is performed and a controller configured to receive an input of an ON/OFF signal of a power switch and control an ON/OFF state of the Bluetooth unit, wherein the controller is configured to light up the display unit by a first lighting signal when receiving the ON signal of the power switch, and light up the display unit by a second lighting signal different from the first lighting signal when the signal is transmitted through the Bluetooth unit.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Terms or words used in the present specification and the appended claims are not limitedly interpreted as usual or dictionary meanings and should be interpreted as meanings and concepts corresponding to the technical spirit of the present disclosure based on the principle that the inventor may appropriately define the concepts of the terms in order to describe his/her invention in the best way.

Throughout the specification, when a part "includes" a component, this means that another component is not excluded but may be further included unless otherwise stated. Further, terms such as " . . . unit," " . . . equipment," "module," and "device" described in the specification mean a unit that processes at least one function or operation which may be implemented by a combination of hardware and/or software.

Throughout the specification, the term "and/or" should be understood as including all possible combinations presentable from one or more related items. For example, the phrase "a first item, a second item and/or a third item" means all combinations of items presentable from two or more of the first, second, and third items as well as the first, second, or third items.

Hereinafter, embodiments of the present disclosure will be described with reference to the accompanying drawings.

Figure 1:
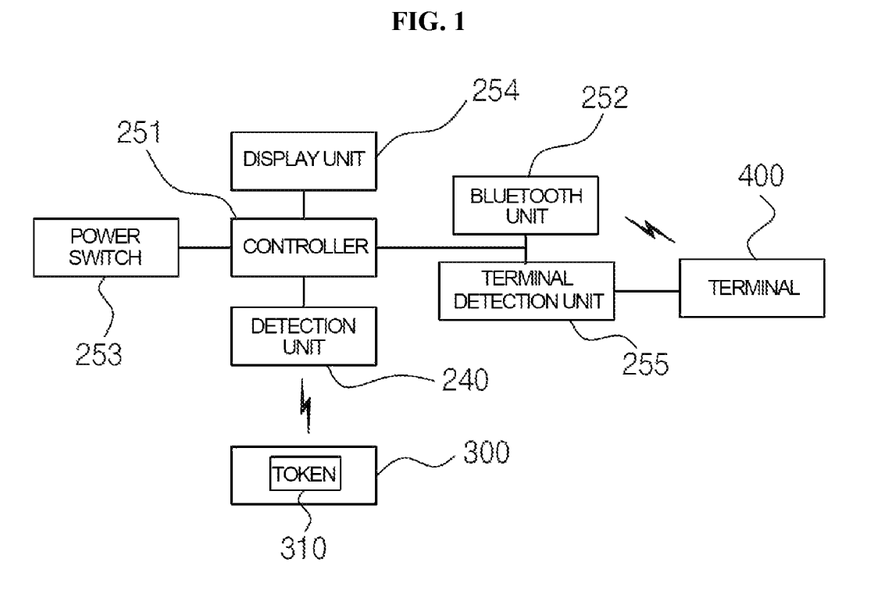
FIG. 1 is a block diagram illustrating a main configuration of a control box for a token according to an embodiment of the present disclosure.
Figure 2:
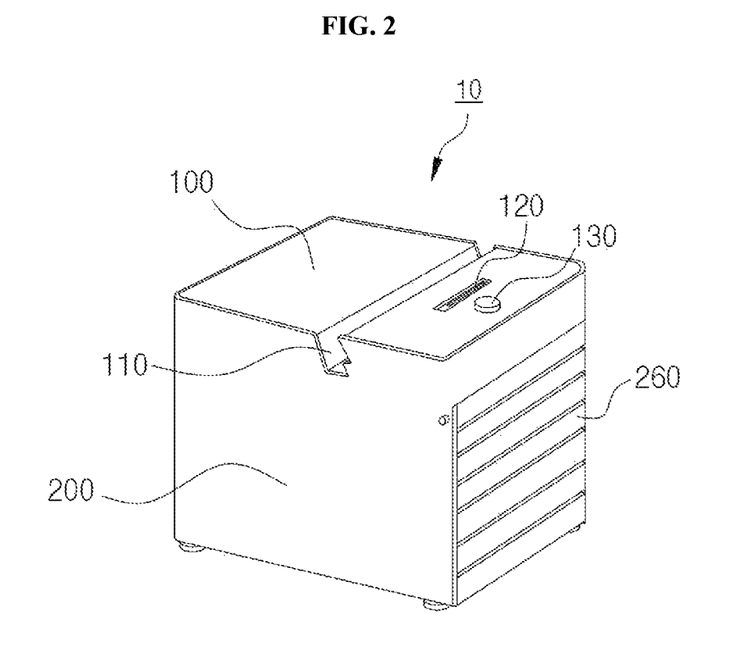
FIG. 2 is a perspective view illustrating the control box according to the present disclosure.

FIG. 1 is a block diagram illustrating a main configuration of a control box for a token according to an embodiment of the present disclosure, and FIG. 2 is a perspective view illustrating the control box according to the present disclosure.

As illustrated, in the control box according to the present disclosure, a token in which a code related to entertainment and learning is recorded is inserted into a reading device, and the corresponding entertainment or learning is progressed in a terminal connected to the reading device in a wired or wireless manner.

To this end, in the present disclosure, when a predetermined token 310 related to learning to be progressed or a predetermined token 310 related to entertainment to be progressed is selected from a token box 300, in which two or more tokens 310 in which different codes are recorded are stored, and is then inserted into a token gate 120 of a reading device 10 on which a terminal 400 is disposed, a detection unit 240 in the reading device 10 reads the code from the inserted token 310, the read code is transmitted to the terminal 400 through a Bluetooth unit 252, and the terminal 400 progresses the learning or the entertainment by driving a learning or entertainment application corresponding to the transmitted code.

In other words, when the reading device 10 reads the code recorded in the token 310 and transmits the read code to the terminal 400, the terminal 400 drives the learning or entertainment application set according to a signal for the transmitted code.

When the code read by the detection unit 240 is transmitted through the Bluetooth unit 252, the terminal 400 is operated to drive the learning or entertainment application corresponding to the code or control a progression stage of displayed learning or entertainment corresponding to the code.

Since the terminal 400 may be a terminal which is configured as a tablet, a smart phone, a personal digital assistant (PDA), or a dedicated terminal and performs short-range wireless communication and Internet communication like a common smart phone, it is preferable that a phone number is used as a unique ID.

Figure 4:
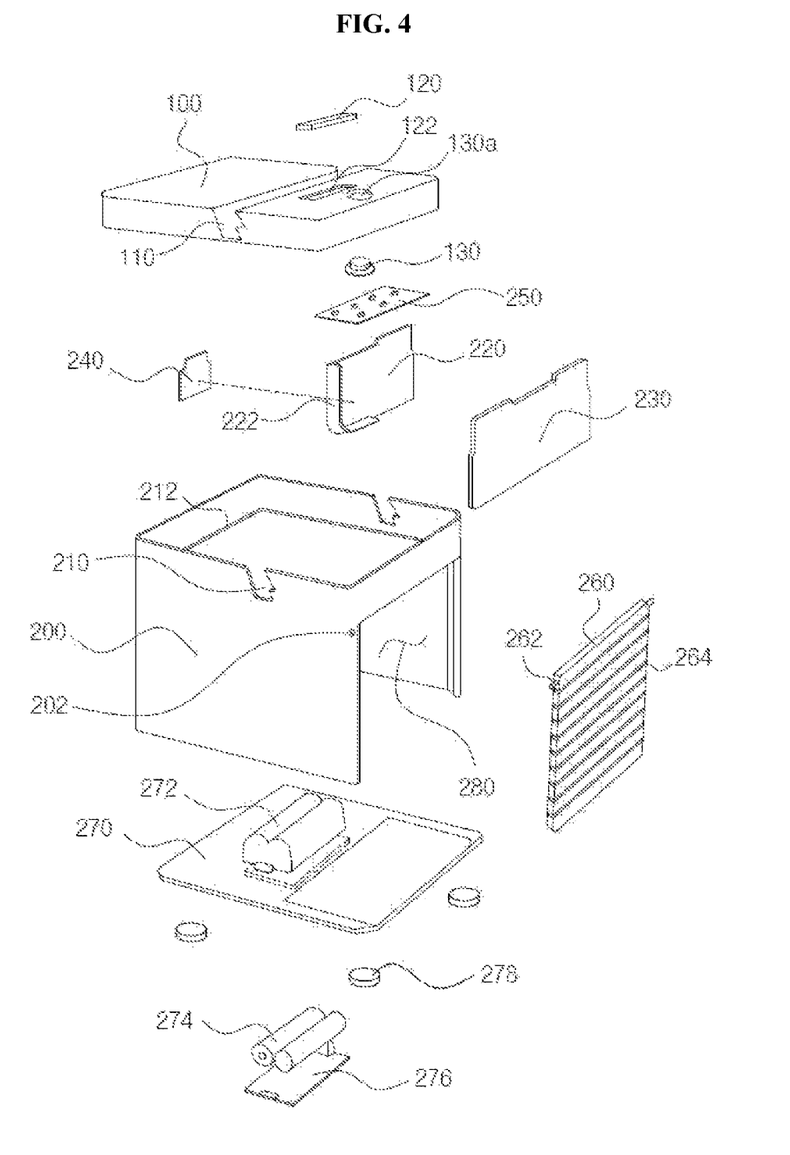
FIG. 4 is an exploded perspective view illustrating the control box according to the present disclosure.

A main configuration of the present disclosure will be described with reference to an exploded perspective view of the control box of FIG. 4 according to the present disclosure.

The reading device 10 includes the token gate 120 into which the token 310 is inserted, a token rail 222 configured to guide the token 310 that is inserted into and falling from the token gate 120, a detection unit 240 configured to detect the code recorded in the token 310, and a storage box 280 in which the token 310 passing through the detection unit 240 is stored.

Further, the reading device 10 further includes a terminal holder 110 formed coplanar with the token gate 120, the terminal 400 being disposed on the terminal holder 110, and the Bluetooth unit 252 configured to transmit the code read by the detection unit 240 to the terminal 400 disposed on the terminal holder 110.

Further, the reading device 10 may include a display unit 254 that is lit up differently when the reading device 10 is turned on or Bluetooth transmission is performed, and a controller 251 configured to receive an input of an ON/OFF signal of a power switch 253 and control an ON/OFF state of the Bluetooth unit 252.

Further, the controller 251 lights up the display unit 254 when the power switch 253 is turned on and lights up the display unit 254 according to a signal different from a lighting signal depending on a power-on signal when a signal is transmitted through the Bluetooth unit 252.

That is, the controller 251 receives the ON/OFF signal of the power switch 253, controls the ON/OFF state of the Bluetooth unit 252, outputs a first lighting signal for red lighting to the display unit 254 including light emitting diodes (LEDs) when receiving the ON signal of the power switch 253, and outputs a second lighting signal for blue lighting, which is different from the first lighting signal, to light up the display unit 254 when the detection unit 240 is operated or a signal is transmitted through the Bluetooth unit 252.

The detection unit 240 is installed between the token gate 120 and the storage box 280 in the reading device 10, is operated to detect the code recorded in the token 310 falling along the token rail 222, transmits the detected code to the terminal 400, and executes the learning or the entertainment.

To this end, various games/software are recorded according to the token 310 stored in the token box 300, and a new game is activated using the token 310.

The tokens 310 are formed in various types in which codes of language such as alphabets such as A, B, C, . . . , German, French, or Spanish, a number such as 1, 2, 3, . . . , an animal, a car, food, and the like which may be stored.

The token may be used for a word matching game including alphabets such as A, B, C, . . . , a character, a fruit, a place, an animal, an idiom, a sentence, and the like, number learning using numbers such as 1, 2, 3, . . . , counting games (all games paying with money) such as marts/department stores/markets/amusement parks, a Sudoku arithmetic game, a multiple choice game, and the like.

Further, a food making game (after a menu is selected, a matching recipe token is inserted to match with the menu) may be progressed using food tokens (a carrot, an apple, a tomato, an onion, a salt, a butter, a cheese, a bread, a ketchup, and the like).

For example, when making a hamburger is selected, a user tries to find the recipe by using "a bread token, a lettuce token, a tomato token, a ketchup token, a cheese token, or the like."

The token 310 and the detection unit 240 are configured with RFID to read data.

The above-described code related to the learning or the entertainment is input into a tag including a chip and an antenna and is attached or inserted into the token 310, and the detection unit 240 is configured as a reader to perform RFID communication.

In detail, when the detection unit 240 emits a radio frequency through the antenna, and the tag of the token 310 responds to the radio frequency to transmit input data to the antenna, the antenna modulates the transmitted data into a digital signal, performs cyclical redundancy check (CRC), and transmits the modulated digital signal to the reader.

The reader, that is, the detection unit 240, transmits the read data to the controller 251.

Further, in the present disclosure, for convenience of description, the communication using the RFID has been described. However, it is obvious that the short-range wireless communication using a bar code and near field communication (NFC) may be used.

Figure 5:
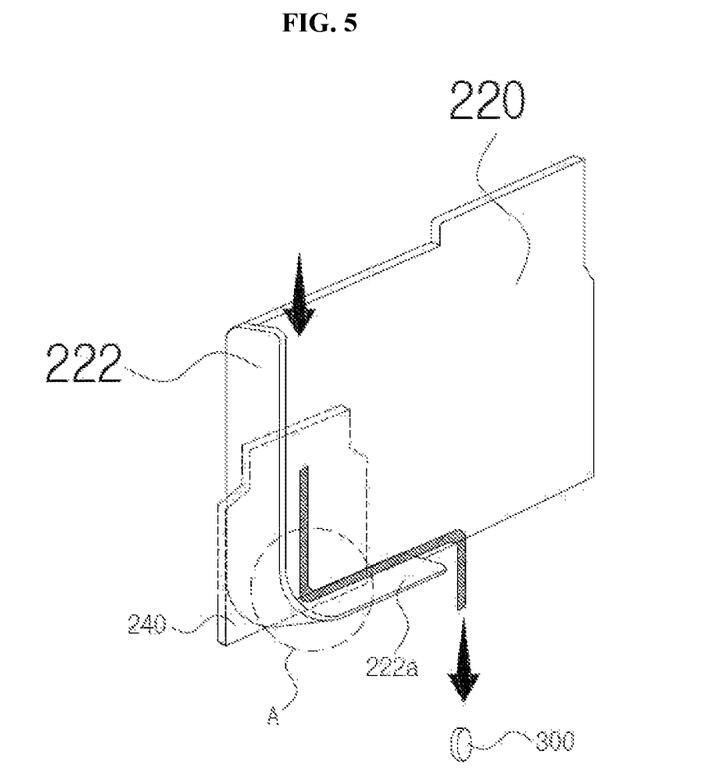
FIG. 5 is a reference view for describing a detection unit.

Referring to the reference drawing for describing the detection unit of FIG. 5, the token rail 222 having an approximately "L" shape is provided on one side of a base bracket 220, and when the token 310 is inserted in the arrow direction from the upper side and falls along the token rail 222, the token 310 is decelerated at an inflection point A at which the direction is changed from a vertical direction to a horizontal direction, rolls along a horizontal part 222a, and falls into and is stored in the storage box 280.

Thus, in order to improve transmission/reception sensitivity of the RFID, the detection unit 240 is formed on a side opposite to the base bracket 220 having the token rail 222 formed therein at the inflection point A to detect an RF signal at the inflection point A.

Meanwhile, it is preferable that the token 310 is configured in a shape, which may be rolled when the token 310 vertically falls, such as a circle or a hexagon, such that the token 310 may move along the token rail 222.

In the present disclosure, the RFID is used in communication between the token 310 and the detection unit 240, and Bluetooth communication is used in communication between the reading device 10 and the terminal 400.

The terminal holder 110 is formed coplanar with the token gate 120 such that the terminal 400 is disposed on the terminal holder 110.

Referring to FIG. 2, a power button 130, the token gate 120, and the terminal holder 110 are sequentially arranged on an upper cover 100 of the reading device 10.

The power button 130 is exposed to the outside through a hole 130a formed in the upper cover 100, and the token gate 120 is fixedly inserted into an insertion part 122 formed in the upper cover 100.

The terminal 400 disposed on the terminal holder 110 is configured to have a predetermined inclination angle such that the user may progress the learning or entertainment at a convenient angle.

Figure 3:
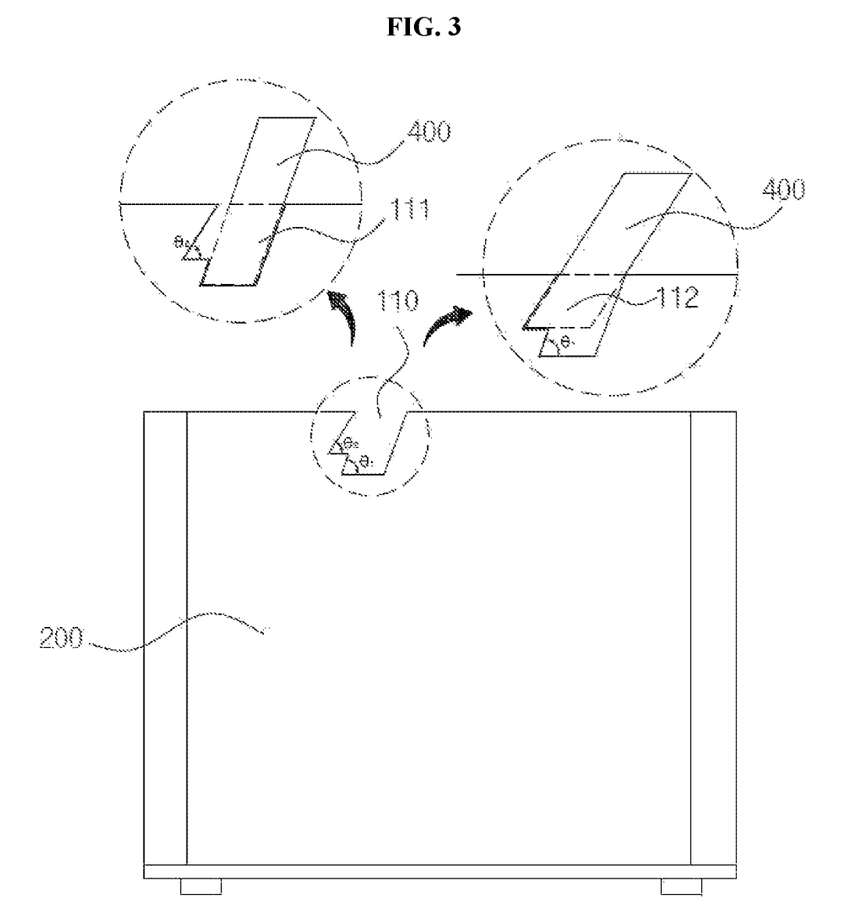
FIG. 3 is an enlarged view illustrating a terminal holder.

Referring to the drawing in which the terminal holder 110 of FIG. 3 is enlarged and illustrated, the terminal holder 110 is configured as a rail-shaped holding groove in which one side of the terminal 400 is inserted and supported.

The terminal holder 110 may be configured to have a first holding part 111 on which the terminal 400 is disposed at a first angle $\theta 1$ and a second holding part 112 on which the terminal 400 is disposed at a second angle $\theta 2$ that is different from the first angle $\theta 1$.

Referring to the enlarged view of FIG. 3, an example is illustrated in which in the terminal holder 110, the terminal 400 is disposed on the first holding part 111 at the first angle $\theta 1$ and disposed on the second holding part 112 at the second angle $\theta 2$.

Meanwhile, a terminal detection unit (not illustrated) that may detect whether the terminal 400 is disposed on the terminal holder 110 may be further provided.

In this case, the controller 251 may control a Bluetooth function of the terminal 400 to be operated when it is determined that the terminal 400 is disposed on the terminal holder 110 and may control the corresponding application to be automatically driven when the code detected in the token 310 is received via the Bluetooth communication, to conduct the corresponding learning or entertainment.

The upper cover 100 is configured to be inserted into and supported by a step 212 formed on an upper inner edge of a body part 200.

The body part 200 includes the upper cover 100 serving as a lid and a lower cover 270 serving as a bottom surface and has the hollow storage box 280 formed inside a lower portion thereof.

That is, the storage box 280 in which the token 310 is stored is formed to have an empty space defined by the upper cover 100, the lower cover 270, three side surfaces, and a folding door 260.

A printed circuit board (PCB) 250 is coupled to a lower portion of the upper cover 100, and the power switch 253, the controller 251, the Bluetooth unit 252, and the like are mounted on the PCB 250 and are operated while being electrically connected to a battery 274 provided on one side of the storage box 280.

The power switch 253 is configured to be turned on/off according to operation of the power button 130.

The above-described detection unit 240 is provided at a lower portion of the PCB 250, and a separation (or deviation) prevention plate 230 disposed on a front surface of the base bracket 220 and configured to guide the token 310 moving along the token rail 222 such that the token 310 does not deviate from a route is coupled to the lower portion of the PCB 250.

The folding door 260 is configured as a folding type 264 so that when the token 310 is reused, the folding door 260 is pushed and opened by a hand, and the token 310 may be thus extracted, and when the hand is removed, the hand is not caught by the folding door 260.

Further, hinges 262 are formed on both sides of an upper end of the folding door 260, and the hinges 262 are configured to be inserted into and rotated about hinge holes 202 formed in the side walls.

A battery holder 272 into which the battery 274 is inserted is provided on the lower cover 270, and a cap 276 that is detachably attached to a bottom surface of the battery holder 272 is coupled to a rear surface of the lower cover 270.

Meanwhile, a support piece 278 for preventing sliding or preventing falling may be installed on the rear surface of the lower cover 270.

In addition, when a rather large terminal such as an iPad or a tablet PC is disposed on the terminal holder 110, the height/the width/the depth, and the like of the body part 200 are considered such that falling may be prevented when a force is applied to operate the terminal 400.

The battery 274 is configured as a general battery power source such as a lithium rechargeable battery or an AA battery and is electrically connected to supply electric power to each component.

The operation of the above-configured control box for a token will be described below.

The terminal 400 is disposed on the terminal holder 110 of the control box for a token by a user, and then the power button 130 turns on first to apply the electric power to a system.

In this case, when receiving the ON signal of the power switch 253, the controller 251 outputs the first lighting signal to cause the display unit 254 including the LEDs to be lit in red so as to indicate that the electric power is applied to the system.

Thereafter, the token 310 for learning or entertainment to be performed is selected from the storage box 280 and is then inserted into the token gate 120.

In this case, when a terminal detection unit 255 is present, the controller 251 activates the Bluetooth function so that the terminal 400 may pre-drive an application related to the present disclosure.

When the token 310 inserted into the token gate 120 falls along the token rail 222 and when the detection unit 240 provided near the inflection point A detects the code recorded in the token 310 and transmits the detected code to the controller 251, the controller 251 outputs the second lighting signal for blue lighting, which is different from the first lighting signal, to light up the display unit 254 and transmits the detected code to the terminal 400 through the Bluetooth unit 252.

The terminal 400 drives the learning or entertainment-related application by analyzing the code received through the Bluetooth communication.

Meanwhile, the token 310 rolling along the token rail 222 is stored in the storage box 280, and the controller 251 transmits a code read from a subsequently inserted token 310 to the terminal 400 to consecutively perform the learning or entertainment.

As described above, according to the control box for a token according to the present disclosure, since the terminal may run the learning or entertainment application using information read from a wireless recognition tag, the use of the tokens enhances the educational effect and the concentration for preschoolers.

Thus, according to the control box for a token according to the present disclosure, since the terminal can run the learning or entertainment application using information read from a wireless recognition tag, the use of the tokens enhances the educational effect and the concentration for preschoolers.

Further, according to the control box for a token according to the present disclosure, the type of the learning or entertainment displayed on the terminal can be easily changed by changing the tokens even without manipulating the terminal.

Further, in the present disclosure, since the codes of the tokens are read through RFID and the communication with the terminal is performed through Bluetooth, more accurate communication can be achieved, and an application can be activated through Bluetooth pairing.

Further, in the present disclosure, since the RFID can be read while a direction of the tokens falling along the shape of the token rail is changed to a horizontal direction, information recorded in the tokens can be read accurately.

Further, in the present disclosure, since the terminal can be safely disposed and used on the control box, both hands of a user are free, and thus the user can enjoy efficient learning or entertainment.

In the above, the present disclosure has been described in detail with respect to the described embodiments. However, it is obvious to those skilled in the art that various modifications and changes may be derived within the scope of the technical spirit of the present disclosure, and it is natural that such modifications and changes belong to the appended claims.

What is claimed is:

1. A control box for a learning or entertainment token, the control box comprising:
   tokens each having a radio frequency identification (RFID) tag in which a code is recorded, wherein the codes recorded in the two or more tokens are different from each other;
   a reading device comprising a base bracket, a token gate which is provided in the base bracket and into which the tokens are inserted, an L-shaped token rail having an inflection point, at which a direction is changed from a vertical direction to a horizontal direction, on one side of the base bracket to guide the tokens inserted into and falling from the token gate, a detection unit having an RFID reader configured to detect the codes recorded in the tokens, and a storage box in which the tokens passing through the detection unit are stored, whereby the codes of the tokens are detected when the tokens which are inserted into the token gate and fall along the token rail are decelerated at the inflection point at which the direction is changed from the vertical direction to the horizontal direction;
   a deviation prevention plate disposed on a front surface of the base bracket and configured to guide the tokens moving along the token rail such that the tokens do not deviate from a route;

a terminal configured to drive a learning or entertainment application according to a transmitted code signal;

a terminal holder on which the terminal is disposed, the terminal holder comprising a first holding part formed coplanar with the token gate, wherein the terminal is disposed on the first holding part at a first angle, and a second holding part on which the terminal is disposed at an angle different from the first angle; and a Bluetooth unit configured to transmit the codes read by the detection unit to the terminal disposed on the terminal holder, wherein the codes read from the tokens through RFID communication by the detection unit are transmitted to the terminal through the Bluetooth unit, and the terminal drives the learning or entertainment application corresponding to the read codes transmitted by the Bluetooth unit and controls a progression stage of displayed learning or entertainment.

2. The control box of claim 1, further comprising:

a display unit comprising light emitting diodes (LEDs) that are lit up differently when a power source is turned on or Bluetooth transmission is performed; and a controller configured to receive an on/off signal of a power switch and control an on/off state of the Bluetooth unit, wherein the controller outputs a first lighting signal for red lighting to the display unit when receiving the on signal of the power switch and outputs a second lighting signal for blue lighting, which is different from the first lighting signal, to light up the display unit when the detection unit is operated, or the signal is transmitted through the Bluetooth unit.

* * * * *